Aug. 30, 1960   J. A. WEBER ET AL   2,950,623
DRIVING MECHANISM
Filed Sept. 15, 1958

Inventors:
Joseph A. Weber
James K. Thomas
Richard Jackson
By: Kenneth J. Snow
Atty 2,950,623
Patented Aug. 30, 1960

2,950,623
DRIVING MECHANISM

Joseph A. Weber, 408 Hill St., and James R. Thomas, 20 E. Stonegate Drive, Prospect Heights, and Richard W. Jackson, 703 N. Pine Ave., Arlington Heights, Ill.; said Thomas and said Jackson assignors to said Weber Filed Sept. 15, 1958, Ser. No. 760,992

3 Claims. (Cl. 74—117)

This invention relates to a new and improved driving mechanism.

There have been multitudinous driving mechanisms of all types to accommodate a great variety of apparatus. The present invention is concerned with incremental driving wherein the amount of movement may be readily adjustable to facilitate many uses.

More particularly it is a principal object of the present invention to provide a new and improved driving mechanism of the type to effect incremental and intermittent movement.

An important object of this invention is to provide an adjustable increment driving mechanism.

Another important object of this invention is the provision of means for indexing a shaft to be driven in adjustable increments in one direction only.

A further important object of this invention is to supply a one-way drive for an indexing or feeding mechanism.

A still further important object of this invention is to provide a continuously rotating crank arm in association with an extensible driving element for imparting incremental drive to a shaft to be driven, and including a one-way clutch means between said extensible driving element and said shaft to be driven.

Other and further important objects and advantages will become apparent from the following specification and accompanying drawings.

Figure 1:
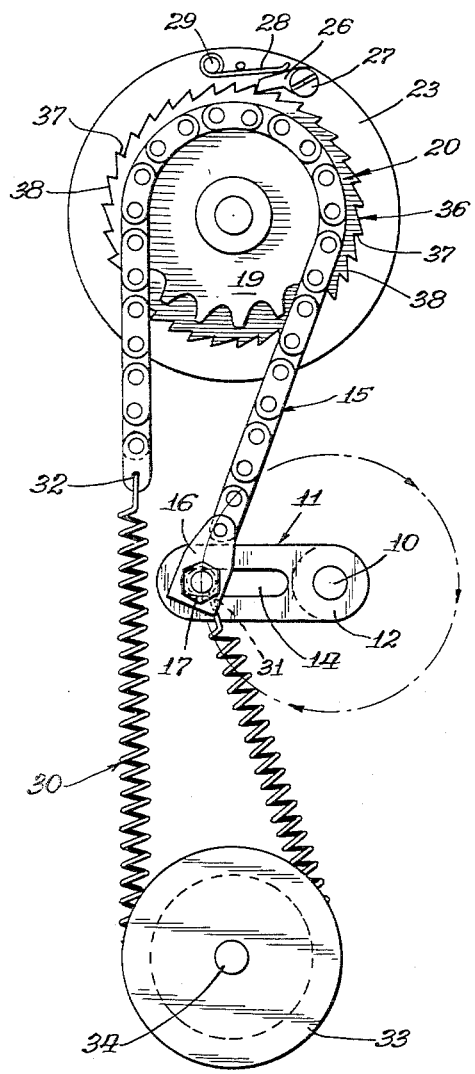
Figure 1 is a front elevational view of the driving mechanism of this invention.
Figure 2:
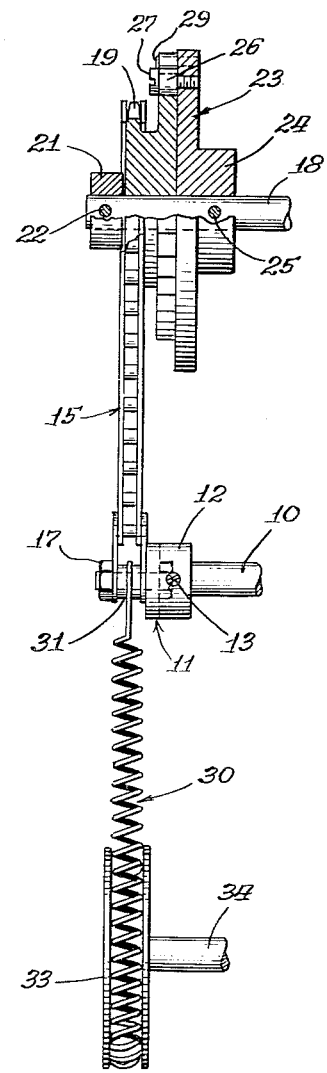
Figure 2 is a side view of the device of Figure 1.

The reference numeral 10 indicates generally a continuously driving shaft. A crank arm 11 has a hub 12 mounted on the driving shaft 10. A set screw 13 passes radially through the hub and engages the shaft 10 so that as the shaft rotates it imparts rotational drive to the crank arm 11.

The crank arm 11 is provided with a radially extending elongated slot 14 which continues for substantially the length of the arm. A chain 15 having a fastening or connecting link 16 is removably fastened to the slot 14 of the crank arm by means of lock nut 17. The chain and its fastening link 16 may thus be adjustably positioned in any desired location throughout the radial extent of the elongated slot 14.

A spaced apart shaft 18, disposed parallel to the driving shaft 10, is to be hereinafter termed the driven shaft. The primary object of this invention is to impart intermittent drive to the driven shaft 18 in regular amounts which may be readily adjusted as desired merely by repositioning the connection of the chain to a new location on the crank arm 11.

A sprocket 19 and ratchet wheel 20 are formed integrally with each other and are journally mounted on the driven shaft 18 so that the sprocket portion 19 thereof is in general planar alignment with the crank arm 11.

A collar 21 is mounted on the shaft 18 and by means of a set screw 22 the collar is fixed relative to the shaft and constitutes the means for holding the sprocket and ratchet wheel in a fixed laterally disposed position on the shaft 18.

A disc or plate member 23 having a hub 24 flanks the other side of the combination sprocket and ratchet wheel element on the shaft 18. A set screw 25 engages the disc hub 24 and abuts the shaft 18 to thus hold the disc member 23 fixed with respect to the shaft. A pawl or dog 26 is hingedly mounted at 27 on the disc or plate member 23. A leaf type spring 28 is mounted on the plate 23 at 29 and normally urges the pawl 26 inwardly against the teeth of the ratchet wheel 20.

A coil spring 30 is joined to the ends of the chain 15 at 31 and 32 and thus the chain and spring together constitute an endless extensible driving element.

A pulley 33 is journally mounted on a shaft 34 which is spaced apart from and parallel to the driving and driven shafts 10 and 18. The pulley 33 is in planar alignment with the crank arm 11 and the sprocket 19.

In operation the endless extensible member comprising the chain 15 and spring 30 has the chain portion engaging the sprocket 19 while the spring is in the annular groove of the pulley 33. The crank arm 11 is fastened to the endless member at the juncture 31 of the chain and spring by means of the chain connecting link 16. The rotation of the crank arm 11 in the direction of the arrow 35 causes a pulling and a retracting of the chain 15 with the spring 30 acting to compensate for the multiple lengths of endless number which are necessary to permit such crank arm rotation. When the chain 15 pulls downwardly the ratchet wheel teeth 36 have their substantially radial walls 37 engage the pawl 26 and thus drive the plate member 23 and its attached shaft 18 through an angular movement commensurate with the throw of the crank arm 11 as regulated by the position of engagement of the chain 15 with the elongated slot 14. Now when the chain is moved upwardly the pawl 26 ratchets over the long angularly inclined surfaces 38 of the ratchet wheel teeth 36. There is thus provided a one-way clutch in association with an incremental driving mechanism. The driving of the shaft 18 is thus intermittent and the amount of rotating may be accurately and easily controlled merely by the position of attachment on the crank arm 11 to thus make longer or shorter the effective length of the crank arm 11 in its operation of the driving mechanism of this invention.

We are aware that numerous details of construction may be varied without departing from the principles of this invention and we do not propose limiting this invention otherwise than as necessitated by the appended claims.

What is claimed is:

1. A driving mechanism comprising a driving shaft, a crank continuously driven by said driving shaft, a shaft to be intermittently driven spaced from said driving shaft and disposed parallel thereto, a ratchet wheel journaled on said shaft to be driven, a member affixed to said shaft to be driven, a pawl hingedly mounted on said member and arranged and constructed to rotate said ratchet wheel in one direction only, a sprocket affixed to and forming a part of said ratchet wheel, said sprocket disposed in the same plane as said crank, a chain engaging said sprocket and having one end attached to said crank, means adjustably positioning said chain along the length of said crank, a pulley spaced from but lying in the same general plane as the crank and sprocket, a spring having one end attached to said crank and the one end of said chain and having its other end attached to the free end of said chain and said spring extending around said pulley whereby the chain and spring together form an endless member and said shaft is intermittently driven in increments commensurate with the position of adjustment of the chain on the crank.

2. A device as set forth in claim 1 in which said means adjustably positioning said chain along the length of said crank includes said crank having an elongated slot extending substantially the length thereof, and removable fastening means attaching said chain in said crank elongated slot.

3. A driving mechanism comprising a driving shaft, a crank driven by said driving shaft, a shaft to be intermittently driven spaced from said driving shaft and parallel thereto, a ratchet wheel journaled on said shaft to be driven, a member affixed to said shaft to be driven, a pawl hingedly mounted on said member and arranged and constructed to engage said ratchet wheel, a chain, a sprocket forming part of said ratchet wheel and disposed in the plane of the crank, said chain engaging said sprocket and having one end attached to said crank, means adjustably positioning along said chain end the length of said crank, a pulley spaced from but lying in the same general plane as the crank and sprocket, a coil spring having one end attached to said crank and the chain attached thereto and having its other end attached to the free end of said chain, said coil spring extending around said pulley whereby said chain and coil spring constitute an endless member of extensible length and an incremental intermittent drive is imparted to said shaft to be driven by the continuous rotation of the crank to a degree commensurate with the position of adjustment of the chain on the crank.

References Cited in the file of this patent

UNITED STATES PATENTS

| 1,788,729 | Meier | Jan. 13, 1931 |
| 1,807,035 | Herman | May 26, 1931 |

FOREIGN PATENTS

| 248,376 | Italy | June 5, 1924 |
| 352,189 | Great Britain | July 9, 1931 |